United States Patent
Wang

(10) Patent No.: US 9,885,779 B2
(45) Date of Patent: Feb. 6, 2018

(54) OPTICAL CALIBRATION SYSTEM ADAPTED FOR OPTICAL DISTANCE MEASUREMENT SYSTEM

(71) Applicant: PIXART IMAGING INC., Hsin-Chu County (TW)

(72) Inventor: Guo-Zhen Wang, Hsin-Chu County (TW)

(73) Assignee: PIXART IMAGING INC., Hsin-Chu County (TW)

(*) Notice: Subject to any disclaimer, the term of this patent is extended or adjusted under 35 U.S.C. 154(b) by 0 days.

(21) Appl. No.: 15/359,911

(22) Filed: Nov. 23, 2016

(65) Prior Publication Data
US 2017/0363723 A1    Dec. 21, 2017

Related U.S. Application Data

(60) Provisional application No. 62/351,504, filed on Jun. 17, 2016.

(51) Int. Cl.
| | | |
|---|---|---|
| G01B 11/14 | (2006.01) | |
| G01S 7/497 | (2006.01) | |
| G01S 17/08 | (2006.01) | |

(52) U.S. Cl.
CPC .............. *G01S 7/497* (2013.01); *G01B 11/14* (2013.01); *G01S 17/08* (2013.01)

(58) Field of Classification Search
CPC ............. G01N 21/9501; G01N 21/956; G01N 2021/8854; G01N 21/95623; G01N 2201/1045; G01N 2021/4792; G01N 21/4738; G01N 21/6408; G01N 2201/121; G02B 27/1026; G02B 27/149; G02B 27/283; G02B 17/0804
See application file for complete search history.

(56) References Cited

U.S. PATENT DOCUMENTS

| | | | |
|---|---|---|---|
| 2005/0013504 A1* | 1/2005 | Noma | G01C 11/02 382/255 |
| 2012/0044213 A1* | 2/2012 | Lu | G01S 7/491 345/175 |
| 2016/0187485 A1 | 6/2016 | Wang | |

* cited by examiner

*Primary Examiner* — Michael P Stafira
(74) *Attorney, Agent, or Firm* — Hauptman Ham, LLP

(57) ABSTRACT

An optical calibration system including a calibration module, a light source, an optical sensing device and a calculation module is provided. The calibration module includes a calibration plane and a plurality of calibration structures between the calibration plane and the light source, wherein the calibration structures are disposed at predetermined calibration positions. The light source projects a linear light section toward the calibration module. The optical sensing device senses reflected light from the calibration plane and the calibration structures reflecting the linear light section to generate a sensed frame. The calculation module calculates positions of gravity centers of a plurality of calibration points in the sensed frame corresponding to the calibration structures.

10 Claims, 6 Drawing Sheets

|  | $P_{30}$ | $P_{160}$ | $P_{290}$ |
|---|---|---|---|
| 5cm | 153.118 | 136.847 | 143.926 |
| 10cm | 195.177 | 190.067 | 192.045 |
| 25cm | 222.412 | 222.662 | 222.742 |

FIG. 5

OPTICAL CALIBRATION SYSTEM ADAPTED FOR OPTICAL DISTANCE MEASUREMENT SYSTEM

CROSS REFERENCE TO RELATED APPLICATION

This application claims the priority benefit of U.S. Provisional Application Serial Number U.S. 62/351,504, filed on Jun. 17, 2016, the full disclosure of which is incorporated herein by reference.

BACKGROUND

1. Field of the Disclosure

This disclosure generally relates to an optical calibration system, more particularly, to an optical calibration system adapted for an optical distance measurement system having a simplified calibration procedure.

2. Description of the Related Art

U.S. patent publication number US 2016187485 A1, assigned to the same assignee of the present disclosure, provides a method and system for optical distance measurement having a low hardware resource requirement, the full disclosure of which is incorporated herein by reference.

Said optical distance measurement method records depth information transformation functions $Z_{30}(x)$, $Z_{160}(x)$, $Z_{290}(x)$, e.g., referring to FIG. 1, corresponding to only a plurality of specific detecting points $P_{30}$, $P_{160}$, $P_{290}$, and determines depth information transformation functions corresponding to all detecting points using the depth information transformation functions $Z_{30}(x)$, $Z_{160}(x)$, $Z_{290}(x)$ and corresponded weighting factors to accordingly calculate object distances.

Positions of said plurality of specific detecting points $P_{30}$, $P_{160}$, $P_{290}$ are previously determined in a calibration stage. The present disclosure provides an optical calibration system adapted for an optical distance measurement system which simplifies a procedure of determining the specific detecting points $P_{30}$, $P_{160}$, $P_{290}$ in the calibration stage.

SUMMARY

One object of the present disclosure is to provide an optical calibration system capable of simplifying the calibration procedure of an optical distance measurement system.

Another object of the present disclosure is to provide a three-dimensional calibration module adapted for an optical calibration system.

The present disclosure provides an optical calibration system including a calibration module, a light source, an optical sensing device, a calculation module and storage unit. The calibration module includes a calibration plane and a plurality of calibration structures, wherein the calibration structures are disposed at predetermined calibration positions in front of the calibration plane. The light source is configured to project a linear light section toward the calibration module. The optical sensing device is configured to sense reflected light formed by the calibration plane and the calibration structures reflecting the linear light section to generate a sensed frame. The calculation module is configured to calculate gravity center positions of a plurality of calibration points in the sensed frame corresponding to the calibration structures. The storage unit is configured to store the gravity center positions of the calibration points.

BRIEF DESCRIPTION OF THE DRAWINGS

Other objects, advantages, and novel features of the present disclosure will become more apparent from the following detailed description when taken in conjunction with the accompanying drawings.

FIG. 5 is gravity center positions of a plurality of calibration points obtained by an optical calibration system according to one embodiment of the present disclosure.

DETAILED DESCRIPTION OF THE EMBODIMENT

It should be noted that, wherever possible, the same reference numbers will be used throughout the drawings to refer to the same or like parts.

Figure 1:
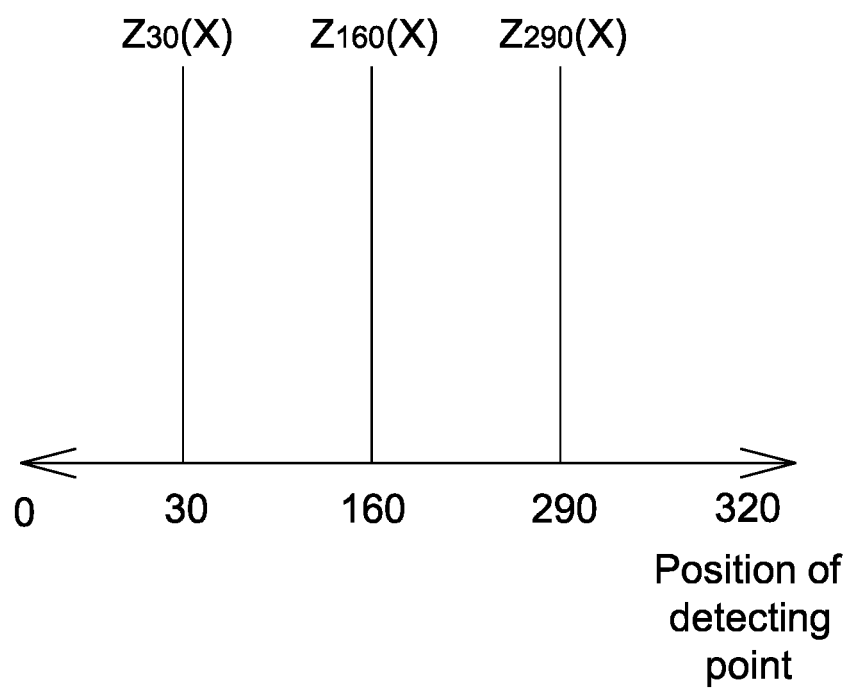
FIG. 1 is a schematic diagram of conventional detecting points and corresponding depth information transformation functions thereof.
Figure 2:
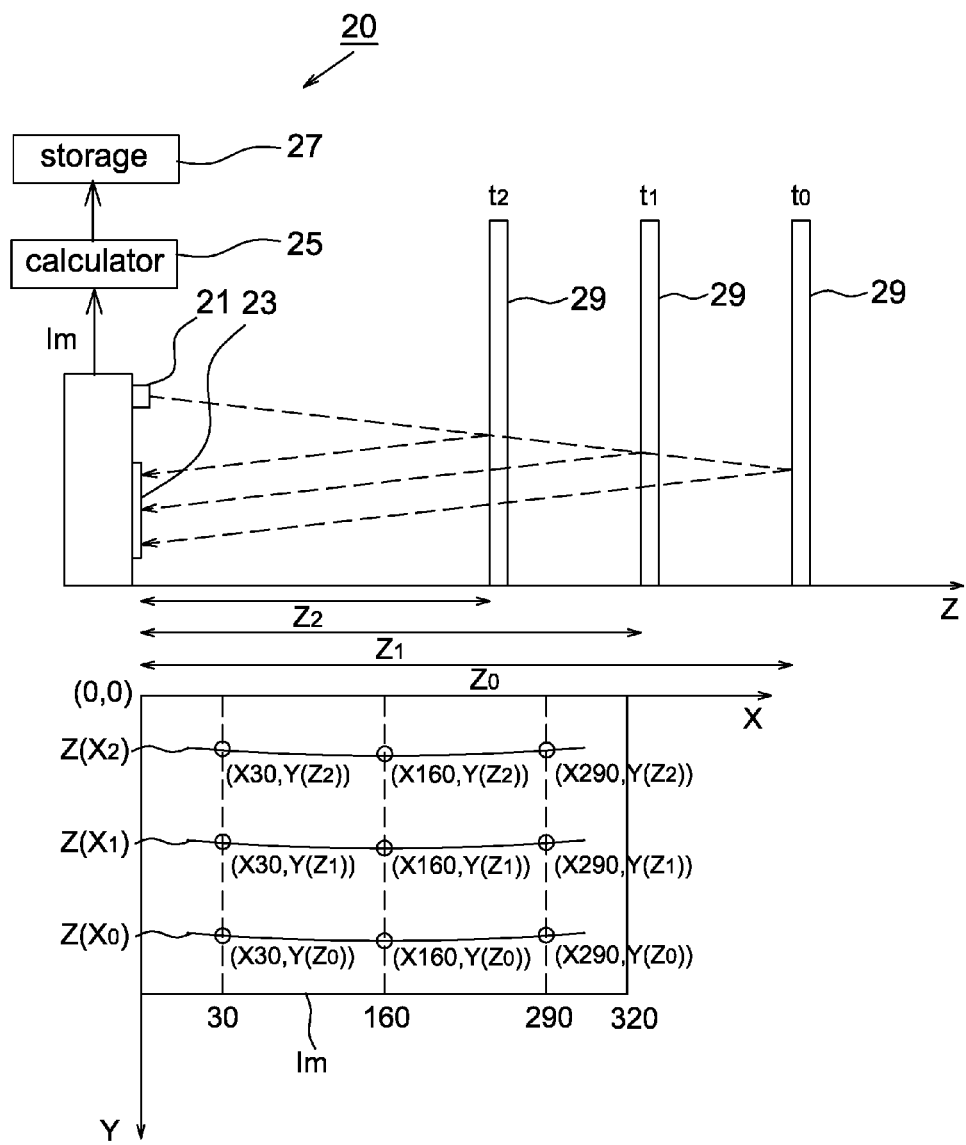
FIG. 2 is a schematic diagram of a calibration method of an optical calibration system according to a first embodiment of the present disclosure.

Referring to FIG. 2, it is a schematic diagram of a calibration method of an optical calibration system according to a first embodiment of the present disclosure. The optical calibration system of the present disclosure includes an optical distance measurement system 20 and a calibration plane 29. The optical calibration system is used to perform a calibration procedure before shipment of the optical distance measurement system 20 to store gravity center positions of a plurality of calibration points, wherein the calibration points are used as pre-stored specific detecting points for obtaining, in conjunction with weighting factors associated with every detecting point and depth information transformation functions associated with said specific detecting points, depth information transformation functions corresponding to all detecting points in actual distance detection. A number of said specific detecting points is smaller than that of all detecting points. Said detecting points are, for example, pixels of an image sensor array. The distance detection of the optical distance measurement system 20 may be referred to U.S. patent publication number US 2016187485 A1 assigned to the same assignee of the present disclosure.

The calibration plane 29 is disposed at different distances (e.g., $Z_0$, $Z_1$, $Z_2$) at different times (e.g., $t_0$, $t_1$, $t_2$), wherein said distance is referred to a vertical distance, e.g., along a norm of the calibration plane 29, relative to the optical distance measurement system 20. For example in one embodiment, $Z_0=25$ cm, $Z_1=10$ cm and $Z_2=5$ cm, but not limited thereto. Said distance is determined according to, for example, a detecting range and/or an image resolution of the optical distance measurement system 20. The calibration plane 29 is made of proper materials without particular limitations, and a surface thereof facing the optical distance measurement system 20 is preferably white to reflect light projected from the optical distance measurement system 20, but the color is not limited to white as long as the projected light of the optical distance measurement system 20 is effectively reflected.

It should be mentioned that the three calibration planes 29 shown in FIG. 2 are referred to one calibration plane 29 being arranged at different vertical distances at different times but not referred to three different calibration planes 29 included in the optical calibration system. It is appreciated that a number of the different vertical distances is not limited to three, and it is possible to be more than three.

The optical distance measurement system 20 includes a light source 21, an optical sensing device 23, a calculation module (or calculator) 25 and a storage unit 27. In some embodiments, the light source 21, the optical sensing device 23, the calculation module 25 and the storage unit 27 of the optical distance measurement system 20 are, for example, encapsulated as a chip. In other embodiments, the optical distance measurement system 20 includes only the light source 21 and the optical sensing device 23, but outputs (wired or wirelessly) a sensed frame Im to an external computer system which includes a calculation module and a storage unit for post-processing the sensed frame Im. More specifically, the optical distance measurement system 20 may or may not have the ability of processing sensed values of the optical sensing device 23. It is possible that the optical distance measurement system 20 outputs raw data captured by the optical sensing device 23.

The light source 21 is a coherent light source, a partial coherent light source or a non-coherent light source, e.g., a light emitting diode (LED) or a laser diode (LD). The light source 21 is disposed, for example, above or below the optical sensing device 23, and used to project a linear light section toward the calibration plane 29, wherein a transverse length and a vertical width of the linear light section as shown in FIG. 2 are determined according to different applications. For example, if a size of the sensed frame Im outputted by the optical sensing device 23 or a detecting range of the optical sensing device 23 is larger, the transverse length is selected to be longer. For example, if a resolution of the optical sensing device 23 is higher, the vertical width is selected to be smaller, but not limited thereto.

The optical sensing device 23 is, for example, a CCD image sensor, a CMOS image sensor or other light sensors for detecting light energy. The optical sensing device 23 preferably has a sensor array including multiple pixels, and each pixel of the sensor array is used as a detecting point in the distance detection. For example, the optical sensing device 23 is arranged on a same surface as the light source 21, and used to receive reflected light from the calibration plane 29 by reflecting the linear light section projected by the light source 21 to generate a sensed frame Im. In other embodiments, the optical sensing device 23 is not disposed at a same surface with the light source 21.

The lower part of FIG. 2 shows linear images $Z(X_0)$, $Z(X_1)$, $Z(X_2)$ respectively outputted by the optical sensing device 23 at different times (e.g., times at $t_0$, $t_1$, $t_2$), wherein as the linear images $Z(X_0)$, $Z(X_1)$, $Z(X_2)$ are captured through lens, the linear images $Z(X_0)$, $Z(X_1)$, $Z(X_2)$ are distorted lines instead of straight lines. The curvature of the distorted lines is determined according to the lens being used. For example, the calibration plane 29 is disposed at a distance $Z_0$ at time $t_0$, and the optical sensing device 23 outputs a linear image $Z(X_0)$; the calibration plane 29 is disposed at a distance $Z_1$ at time $t_1$ and the optical sensing device 23 outputs a linear image $Z(X_1)$; and the calibration plane 29 is disposed at a distance $Z_2$ at time $t_2$, and the optical sensing device 23 outputs a linear image $Z(X_2)$; wherein time $t_0$ may be earlier or later than time $t_1$, and time $t_1$ may be earlier or later than time $t_2$ without particular limitations.

It is appreciated that the three linear images $Z(X_0)$, $Z(X_1)$, $Z(X_2)$ in FIG. 2 are not captured in a same sensed frame Im but in three different frames. For showing the positional relationship between the three linear images $Z(X_0)$, $Z(X_1)$, $Z(X_2)$, all three linear images $Z(X_0)$, $Z(X_1)$, $Z(X_2)$ are shown in FIG. 2 together.

The calculation module 25 receives the sensed frames Im outputted by the optical sensing device 23 (e.g., outputted at different times $t_0$, $t_1$, $t_2$), and calculates the gravity center positions of a plurality of calibration points (e.g., shown as ($X30,Y(Z_2)$), ($X160,Y(Z_2)$), ($X290,Y(Z_2)$), ($X30,Y(Z_1)$), ($X160,Y(Z_1)$), ($X290,Y(Z_1)$), ($X30,Y(Z_0)$), ($X160,Y(Z_0)$), ($X290,Y(Z_0)$)) on the linear images $Z(X_0)$, $Z(X_1)$, $Z(X_2)$ to be used as detecting points in the followed distance calculation. For example, it is assumed that a transverse resolution (e.g., along X-direction) of the sensed frame Im includes 320 pixels, and the calibration points are previously selected as a middle pixel and two pixels separated from two edges of the sensed frame Im by a predetermined distance. For example, pixels 30, 160 and 290 are shown herein, but not limited thereto. The predetermined distance may be determined according to the optical distortion of the lens being used.

The calculation module 25 is, for example, a digital signal processor (DSP), a central processing unit (CPU), a microcontroller (MCU), an application specific integrated circuit (ASIC) to perform the operation by software and/or hardware.

In addition, before calculating the gravity center positions of the predetermined calibration points, the calculation module 25 may firstly exclude unreliable sensed values, e.g., using region of interesting (ROI) filtering, threshold filtering, and confidence level filtering, to improve the calculation accuracy. The method of excluding unreliable sensed values may be referred to U.S. patent publication number US 2016187485 A1 assigned to the same assignee of the present disclosure.

The gravity center positions of the predetermined calibration points, e.g., referring to FIG. 5, obtained by the calculation module 25 are then pre-stored in the storage unit 27 for being accessed by the calculation module 25 in actually calculating the object distance. The nine values shown in FIG. 5 indicate pixel positions in a Y-direction. The storage unit 27 includes volatile memory and/or non-volatile memory without particular limitations.

In the first embodiment, the optical calibration system is illustrated by previously storing gravity center positions of 9 calibration points before shipment. In other embodiments, the optical calibration system may store the gravity center positions of more or less calibration points before shipment depending on the distance measurement algorithm adopted by the optical distance measurement system 20. The distance measurement algorithm used by the optical distance measurement system 20 may be referred to U.S. patent publication number US 2016187485 A1 assigned to the same assignee of the present disclosure. The present disclosure is to provide a method of how to previously calculate and store the gravity center positions of a plurality of predetermined calibration points before shipment to be used as the specific detecting points in the distance measurement algorithm.

Figure 3:
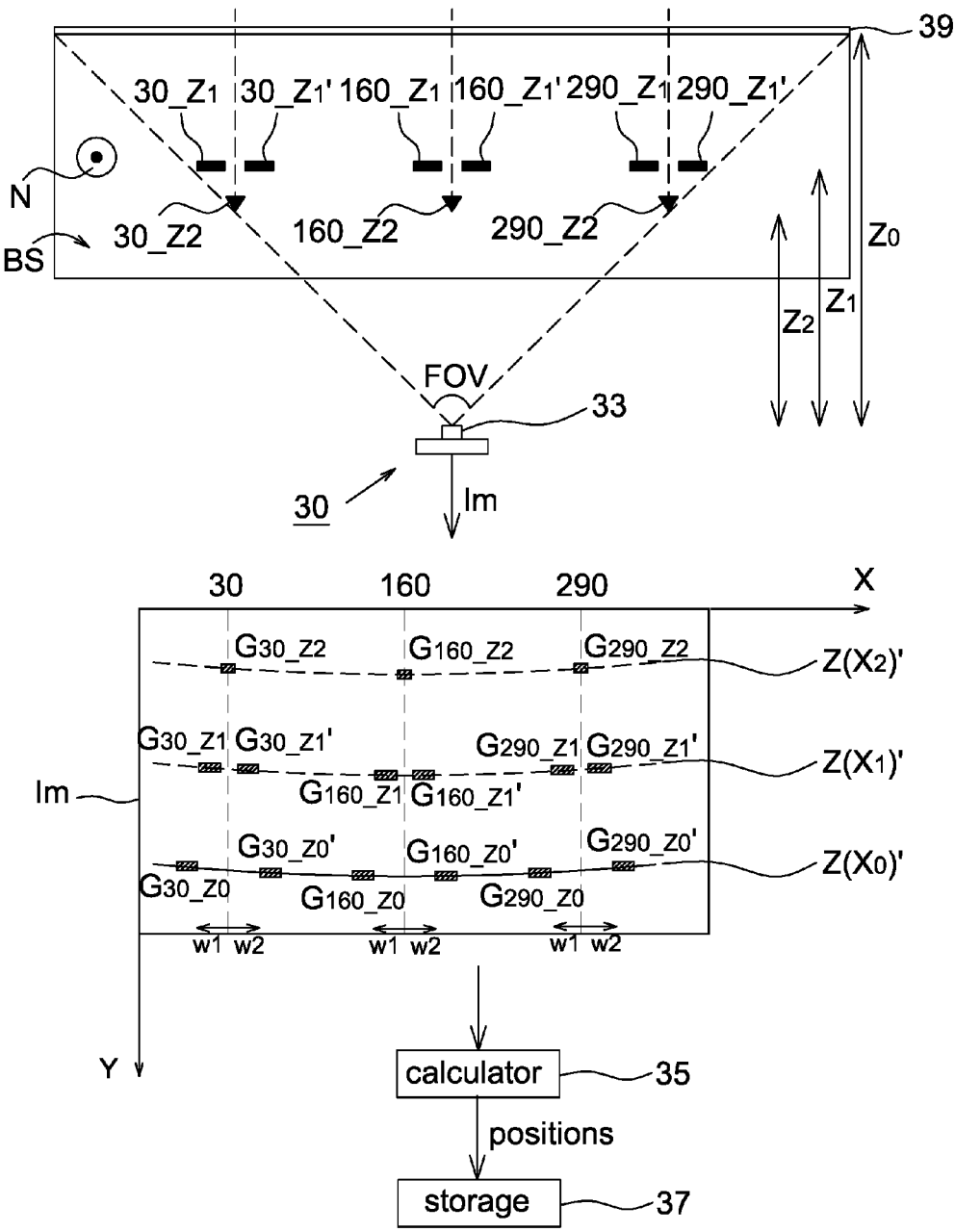
FIG. 3 is an upper view of an optical calibration system according to a second embodiment of the present disclosure and a schematic diagram of a sensed frame outputted by an optical sensing device.

Referring to FIG. 3, it is an upper view of an optical calibration system according to a second embodiment of the present disclosure and a schematic diagram of a sensed frame Im outputted by an optical sensing device. As mentioned above, in the calibration procedure of the first embodiment of the present disclosure, the optical calibration system calculates the gravity center positions of predetermined calibration points according to more than one sensed frames Im captured at different times. In the second embodiment of the present disclosure, an optical calibration system employs a three-dimensional (3D) calibration module to obtain the gravity center positions of a plurality of calibration points using one sensed frame Im. Accordingly, the calibration procedure is effectively simplified especially suitable for mass production.

The optical calibration system of the second embodiment includes a calibration module and an optical distance measurement system 30, wherein the optical distance measurement system 30 also includes a light source (as the light source 21 in FIG. 2), an optical sensing device 33, a calculation module (or calculator) 35 and a storage unit 37. More specifically, the optical distance measurement system 30 of the second embodiment is identical to the optical distance measurement system 20 of the first embodiment. The light source is arranged above (as shown in FIG. 2) or below the optical sensing device 33. The calibration module is arranged in front of and facing a surface for disposing the light source and the optical sensing device 33.

As the light source, the optical sensing device 33, the calculation module 35 and the storage unit 37 of the second embodiment are identical to those of the first embodiment, details thereof are not repeated herein. Only in the second embodiment, the calculation modules 35 is able to obtain the gravity center positions of a plurality of calibration points according to one sensed frame Im without calculating the gravity center positions according to several sensed frames Im captured at different times. In some embodiments, the calculation module 35 calculates an average value of a predetermined number of the gravity center positions, which are associated with each calibration point, in the predetermined number of sensed frames Im captured at different times as a method of calculating each gravity center position.

Figure 4:
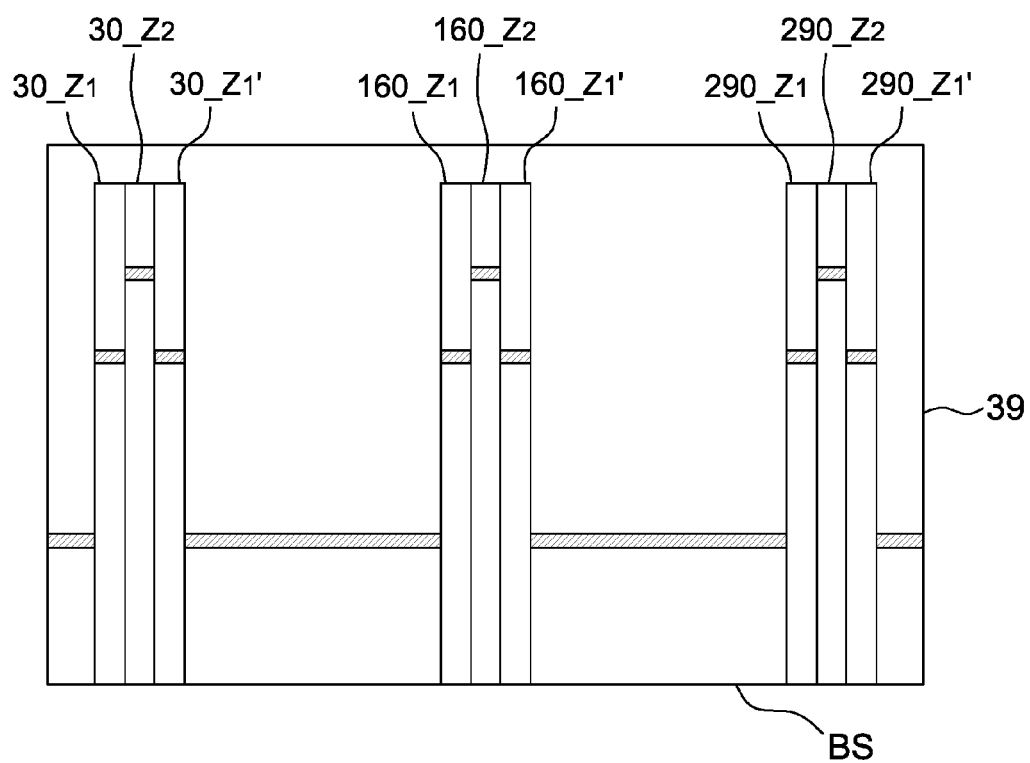
FIG. 4 is a front view of a calibration module of an optical calibration system according to a second embodiment of the present disclosure and projected light sections thereon.

Referring to FIGS. 3 and 4, FIG. 4 is a front view of a calibration module of an optical calibration system according to a second embodiment of the present disclosure and projected light sections thereon, wherein regions filled with slant lines are referred to the projected light sections projected by a light source toward the calibration module. In FIG. 4, as different calibration structures have different distances from the light source, vertical positions (i.e. heights) of the projected light sections are also different on different calibration structures.

The calibration module includes a calibration plane 39 (e.g., identical to the calibration plane 29 of the first embodiment) and a plurality of calibration structures, e.g., $30\_Z_2$, $30\_Z_1$, $30\_Z_1'$, $160\_Z_2$, $160\_Z_1$, $160\_Z_1'$, $290\_Z_2$, $290\_Z_1$, $290\_Z_1'$, wherein the values 30, 160, 290 are referred to pixel positions (transverse positions) of predetermined calibration points in a sensed frame Im. That is, the arrangement of the calibration structures is designed according to the predetermined calibration points in the sensed frame Im. If more/less detecting points are used in calculating distances, more/less calibration structures are used to obtain more/less pixel positions of calibration points. The calibration structures are disposed at predetermined calibration positions in front of the calibration plane 39, and the calibration positions correspond to pixel positions of predetermined calibration points in the sensed frame Im. The calibration plane 39 faces the light source and the optical sensing device 33.

In some embodiments, the calibration plane 39 and the calibration structures are formed as an integral structure by injection molding, but not limited thereto.

Figure 6:
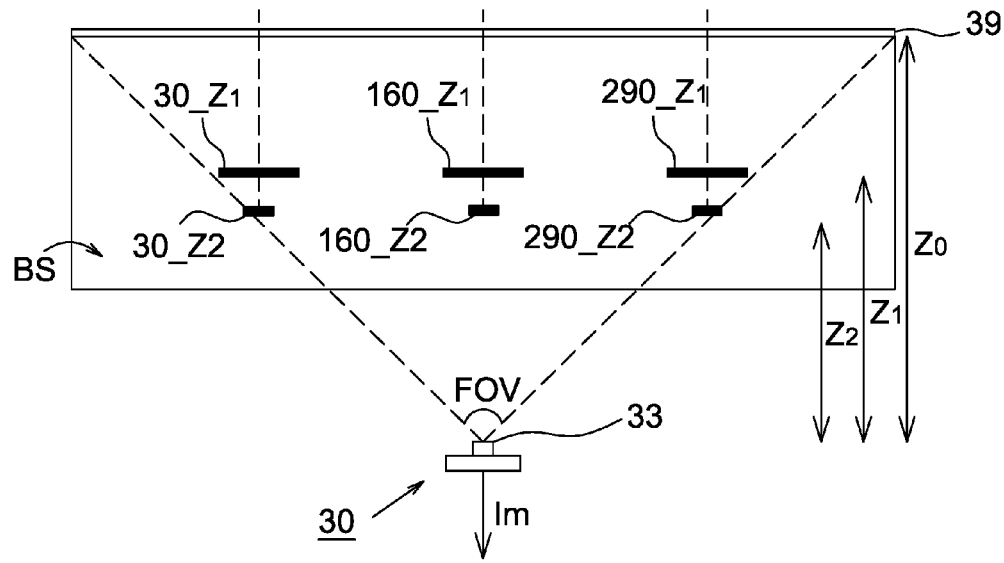
FIGS. 6-7 are upper views of optical calibration systems according to other embodiments of the present disclosure.

In some embodiments, all the calibration structures corresponding to different calibration positions (each calibration position in space corresponding to one calibration point in the sensed frame Im) are separated from each other. For example, FIGS. 3 and 6 show that each calibration structure is an independent cylindrical or protrusion structure, and a cross-sectional shape and a height of said cylindrical or protrusion structure has no particular limitations as long as the light source is able to project linear light sections on the calibration structures and the calibration plane 39, respectively. In this case, the calibration module may further include a bottom surface BS perpendicular and connected to the calibration plane 39, and the calibration structures are disposed at the bottom surface BS and extended from the bottom surface BS toward a normal line N of the bottom surface BS to fix the location of the calibration structures. In some embodiments, the optical distance measurement system 30 is also disposed on the bottom surface BS.

Figure 7:
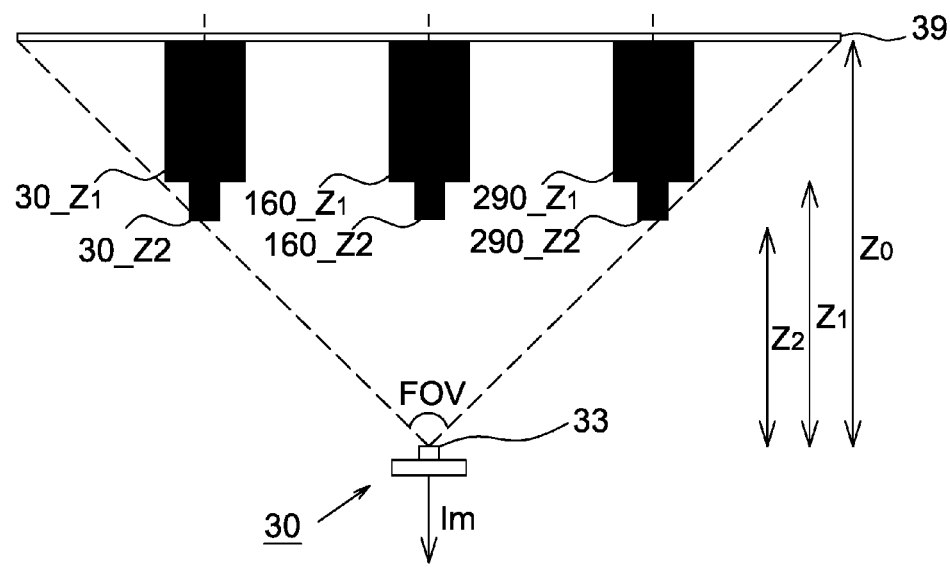

In some embodiments, a part of the calibration structures corresponding to different calibration positions are connected together. For example, FIG. 7 shows that the calibration structures corresponding to a same calibration point (e.g., at pixels 30, 160, 290) are disposed at the calibration plane 39 and extended from the calibration plane 39 toward a front direction of the calibration plane 39. Only different cross-sectional sizes are formed at different heights corresponding to predetermined calibration points. In this case, the calibration module may or may not include the bottom surface BS.

The light source (e.g., light source 20 shown in FIG. 2) is used to project a linear light section toward the calibration module. No matter which of FIG. 3, 6 or 7 is used to arrange the calibration structures, the distribution of the linear projected light sections may be created as FIG. 4. In this case, the light source is disposed above the optical sensing device 33, and thus a position (or height) of the projected light section on the calibration structure which is closer to the light source is higher. On the contrary, if the light source is disposed below the optical sensing device 33, a position (or height) of the projected light section on the calibration structure which is closer to the light source is lower. Similarly, to effectively reflect projected light from the light source, the surface of the calibration structures facing the optical distance measurement system 30 is preferably white, but the color is not limited to white as long as the projected light is reflected effectively.

The optical sensing device 33 is used to sense reflected light formed by the calibration plane 39 and the calibration structures $30\_Z_2$, $30\_Z_1$, $30\_Z_1'$, $160\_Z_2$, $160\_Z_1$, $160\_Z_1'$, $290\_Z_2$, $290\_Z_1$, $290\_Z_1'$ reflecting the linear light section projected thereon to generate a sensed frame Im as shown in FIG. 3. In this embodiment, as the calibration structures are disposed between the calibration plane 39 and the optical sensing device 33, a calibration structure closer to the light source can block a calibration structure farther from the light source and also block the calibration plane 39. Accordingly, a transverse width (or disposed positions) of the calibration structures farther from the light source is designed to be larger (or separated farther) than that of the calibration structures closer to the light source such that the optical sensing device 33 is able to detect the projected light section thereon. In addition to the calibration structures closest to the light source (e.g., $30\_Z_2$, $160\_Z_2$, $290\_Z_2$), the optical sensing device 33 acquires two sensed light sections corresponding to each calibration point. Said two sensed light sections are preferably located at two opposite sides of a single sensed light section associated with the calibration structure closest to the light source as shown in FIG. 3.

For example, corresponding to a calibration point at pixel 30 and vertical distance $Z_1$ (e.g., $(X30,Y(Z_1))$ in FIG. 2), the optical sensing device 33 acquires two sensed light sections $G_{30\_Z1}$ and $G_{30\_Z1}'$ which are obtained by respectively detecting projected light sections on the calibration structures $30\_Z_1$ and $30\_Z_1'$; and corresponding to a calibration point at pixel 30 and vertical distance $Z_0$ (e.g., $(X30,Y(Z_0))$ in FIG. 2), the optical sensing device 33 acquires two sensed light sections $G_{30\_Z0}$ and $G_{30\_Z0}'$ which are obtained by respectively detecting projected light sections (only a part of interest shown in FIG. 3, the part of interest being determined by the calculation module 35, e.g., selecting a part from the sensed light section) on the calibration plane 39. Similarly, sensed light sections $G_{160\_Z1}$ and $G_{160\_Z1}'$, $G_{160\_Z0}$ and $G_{160\_Z0}'$, $G_{290\_Z1}$ and $G_{290\_Z1}'$, $G_{290\_Z0}$ and $G_{290\_Z0}'$ corresponding to pixels 160 and 290 are also shown in FIG. 3. In FIG. 3, $Z(X_1)'$ and $Z(X_2)'$ are shown by dotted lines as the space outside the calibration structures does not generate reflected light.

The calculation module 35 calculates the gravity center positions of a plurality of calibration points in the sensed frame Im corresponding to the calibration structures and the calibration plane 39.

Regarding the calibration structures closest to the optical distance measurement system 30, as shown in FIG. 3 the optical sensing device 33 captures a single sensed light section $G_{30\_Z2}$, $G_{160\_Z2}$, $G_{290\_Z2}$. Accordingly, the calculation module 35 directly calculates a gravity center position of the single sensed light section as a position of the calibration point.

Regarding the calibration structures not closest to the optical distance measurement system 30, as shown in FIG. 3 the optical sensing device 33 respectively captures two sensed light sections $G_{30\_Z1}$ and $G_{30\_Z1}'$, $G_{160\_Z1}$ and $G_{160\_Z1}'$, $G_{290\_Z1}$ and $G_{290\_Z1}'$ corresponding to each calibration point. Accordingly, the calculation module 35 further calculates a weighted average of two gravity center positions in the sensed frame Im associated with an identical calibration point as a gravity center position of the identical calibration point. For example, it is assumed that a distance between the sensed light section $G_{30\_Z1}$ and the pixel 30 is w1, a distance between the sensed light section $G_{30\_Z1}'$ and the pixel 30 is w2, a gravity center position of the sensed light section $G_{30\_Z1}$ is G1, and a gravity center position of the sensed light section $G_{30\_Z1}'$ is G2, the calculation module 35 then calculates $(G2 \times w1 + G1 \times w2)/(w1+w2)$ as a gravity center position of the calibration point $(X30,Y(Z_1))$. Similarly, the gravity center positions, e.g., shown in FIG. 5, of the calibration points $(X160,Y(Z_1))$ and $(X290,Y(Z_1))$ are also obtainable by the same way, wherein values of w1 and w2 may be previously set (e.g., by arranging the corresponding calibration structures) to be identical or different according to the design of the calibration module without particular limitations.

The calibration plane 39 is also blocked by the calibration structures, and as shown in FIG. 3 the optical sensing device 33 respectively captures two sensed light sections $G_{30\_Z0}$ and $G_{30\_Z0}'$, $G_{160\_Z0}$ and $G_{160\_Z0}'$, $G_{290\_Z0}$ and $G_{290\_Z0}'$ (only a part of interest shown herein) corresponding to each calibration point. Accordingly, the calculation module 35 further calculates a weighted average of two gravity center positions in the sensed frame Im associated with an identical calibration point as a gravity center position of the identical calibration point. For example, it is assumed that a distance between the sensed light section $G_{30\_Z0}$ and the pixel 30 is w1, a distance between the sensed light section $G_{30\_Z0}'$ and the pixel 30 is w2, a gravity center position of the sensed light section $G_{30\_Z0}$ is G1, and a gravity center position of the sensed light section $G_{30\_Z0}'$ is G2, the calculation module 35 then calculates $(G2 \times w1 + G1 \times w2)/(w1+w2)$ as a gravity center position of the calibration point $(X30,Y(Z_0))$. Similarly, the gravity center positions, e.g., shown in FIG. 5, of the calibration points $(X160,Y(Z_0))$ and $(X290,Y(Z_0))$ are also obtainable by the same way, wherein values of w1 and w2 may be previously set to be identical or different according to the selected pixels in the sensed frame Im without particular limitations.

The storage unit 37 is then used to store the gravity center positions of a plurality of predetermined calibration points obtained by the calculation module 35 as shown in FIG. 5 for example. It is appreciated that values shown in FIG. 5 are only intended to illustrate but not to limit the present disclosure.

To correctly calculate the gravity center positions of the calibration points, sizes of the calibration structures are arranged to cause sensed light sections of associated calibration points thereof in the sensed frame Im to occupy identical pixel ranges, e.g., 2 pixels in a transverse direction, but not limited thereto. That is, a width of a side of each calibration structure facing the optical distance measurement system 30 determines a transverse width of the projected light section thereon, and the transverse width of the projected light section determines a width of the associated sensed light section in the sensed frame Im. Accordingly, in order to allow the projected light sections on the calibration structures at different vertical distances to induce substantially identical sensed light sections in the sensed frame Im, the calibration structure closer to the optical sensing device 33 may have a smaller transverse width, and the calibration structure farther from the optical sensing device 33 may have a larger transverse width. For example, the transverse width of calibration structures $30\_Z_2$, $160\_Z_2$, $290\_Z_2$ is smaller than that of calibration structures $30\_Z_1$, $30\_Z_1'$, $160\_Z_1$, $160\_Z_1'$, $290\_Z_1$ and $290\_Z_1'$. The calibration structures $30\_Z_2$, $160\_Z_2$, $290\_Z_2$ preferably have identical sizes, and the calibration structures $30\_Z_1$, $30\_Z_1'$, $160\_Z_1$, $160\_Z_1'$, $290\_Z_1$ and $290\_Z_1'$ preferably have identical sizes.

It is appreciated that values, e.g., pixel positions and vertical distances, mentioned in the above embodiments are only intended to illustrate but not to limit the present disclosure.

As mentioned above, an optical distance measurement system needs to pre-store gravity center positions of a plurality of predetermined detecting points using a calibration stage, and stores depth information transformation functions corresponding to the gravity center positions. Therefore, the present disclosure provides an optical calibration system adapted for optical distance measurement systems (as shown in FIGS. 3, 6-7) that utilizes a three-dimensional calibration module to perform a one-time calibration to simplify the calibration procedure.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical calibration system comprising:
    a calibration module comprising a calibration plane and a plurality of calibration structures, wherein the calibration structures are disposed at predetermined calibration positions in front of the calibration plane;
    a light source configured to project a linear light section toward the calibration module;
    an optical sensing device configured to sense reflected light formed by the calibration plane and the calibration structures reflecting the linear light section to generate a sensed frame;
    a calculation module configured to calculate gravity center positions of a plurality of calibration points in the sensed frame corresponding to the calibration structures; and
    a storage unit configured to store the gravity center positions of the calibration points.

2. The optical calibration system as claimed in claim 1, wherein the calibration plane and the calibration structures are formed as an integral structure by injection molding.

3. The optical calibration system as claimed in claim 1, wherein the light source is disposed above or below the optical sensing device, and the calibration module is disposed in front of a surface disposing the light source and the optical sensing device.

4. The optical calibration system as claimed in claim 1, wherein all the calibration structures corresponding to different calibration positions are separated from each other.

5. The optical calibration system as claimed in claim 1, wherein a part of the calibration structures corresponding to different calibration positions are connected together.

6. The optical calibration system as claimed in claim 1, wherein
    the calibration module further comprises a bottom surface perpendicular to the calibration surface, and
    the calibration structures are disposed at the bottom surface and extended from the bottom surface toward a normal line of the bottom surface.

7. The optical calibration system as claimed in claim 1, wherein the calibration structures are disposed at the calibration plane and extended from the calibration plane toward a front direction of the calibration plane.

8. The optical calibration system as claimed in claim 1, wherein
    the calibration structures are disposed between the calibration plane and the optical sensing device, and respectively have a vertical distance from the optical sensing device, and
    the calculation module is further configured to calculate a weighted average of two gravity center positions in the sensed frame associated with an identical calibration point as a gravity center position of the identical calibration point.

9. The optical calibration system as claimed in claim 1, wherein the calculation module is further configured to calculate gravity center positions of a plurality of calibration points in the sensed frame corresponding to the calibration plane.

10. The optical calibration system as claimed in claim 1, wherein sizes of the calibration structures are arranged to cause sensed light sections of associated calibration points thereof in the sensed frame to have identical pixel ranges.

* * * * *